US012801852B2

(12) United States Patent
Wang et al.

(10) Patent No.: US 12,801,852 B2
(45) Date of Patent: Nov. 17, 2026

(54) LANGUAGE MODEL SUMMARIZATION USING SEMANTICAL CLUSTERING

(71) Applicant: Oracle International Corporation, Redwood Shores, CA (US)

(72) Inventors: Zheng Wang, Sammamish, WA (US); Yazhe Hu, Bellevue, WA (US); Mengqing Guo, Redmond, WA (US); Tao Sheng, Bellevue, WA (US); Jun Qian, Bellevue, WA (US); Vinod M. Mamtani, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 18/657,308

(22) Filed: May 7, 2024

(65) Prior Publication Data

US 2025/0094716 A1 Mar. 20, 2025

Related U.S. Application Data

(60) Provisional application No. 63/538,756, filed on Sep. 15, 2023.

(51) Int. Cl.
*G06F 40/289* (2020.01)
*G06F 40/216* (2020.01)

(52) U.S. Cl.
CPC .......... *G06F 40/289* (2020.01); *G06F 40/216* (2020.01)

(58) Field of Classification Search
None
See application file for complete search history.

(56) References Cited

U.S. PATENT DOCUMENTS 11,769,017 B1 9/2023 Gray
12,008,332 B1 * 6/2024 Gardner ................ G06F 16/345
(Continued)

FOREIGN PATENT DOCUMENTS

CN 116910275 10/2023

OTHER PUBLICATIONS

Alguliyev, Rasim M., et al. "COSUM: Text summarization based on clustering and optimization." Expert Systems 36.1 (2019): e12340. (Year: 2019).*
(Continued)

*Primary Examiner* — Douglas Godbold
(74) *Attorney, Agent, or Firm* — Hickman Becker Bingham Ledesma LLP

(57) ABSTRACT

Techniques for language model (LM) summarization using semantical clustering are provided. In one technique, a plurality of concepts reflected in text data is identified. A plurality of concept clusters is generated based on similarity among the plurality of concepts. Thus, some concept clusters may include multiple concepts. For each concept cluster of the plurality of concept clusters, an LM generates a summary of the text corresponding to that concept cluster. A summary response of the text data is generated by aggregating the summary of each concept cluster of the plurality of concept clusters. In another technique, an LM generates a summary based on text data. A first set of concepts reflected in the summary is identified and a second set of concepts reflected in the text data is identified. A difference between the two sets may indicate that the summary is missing one or more concepts.

20 Claims, 5 Drawing Sheets

(56) References Cited

U.S. PATENT DOCUMENTS

| | | | | |
|---|---|---|---|---|
| 2018/0011920 | A1* | 1/2018 | Simske | G06N 20/00 |
| 2019/0005052 | A1* | 1/2019 | Ura | G06F 16/93 |
| 2022/0083579 | A1* | 3/2022 | Singh | G06F 18/22 |
| 2022/0374598 | A1* | 11/2022 | Osuala | G06N 20/00 |
| 2024/0061874 | A1* | 2/2024 | Arslan | G06N 20/00 |
| 2024/0078380 | A1* | 3/2024 | Madhusudhan | G06F 40/56 |
| 2024/0428005 | A1* | 12/2024 | Abraham | G06F 16/38 |
| 2025/0061291 | A1* | 2/2025 | Gardner | G06F 40/56 |
| 2025/0166609 | A1* | 5/2025 | Dreyer | G10L 15/16 |
| 2025/0225323 | A1* | 7/2025 | Bu | G06F 40/284 |

OTHER PUBLICATIONS

Xiao et al., "Enhancing LLM with Evolutionary Fine-Tuning for News Summary Generation" https://arxiv.org/ftp/arxiv/papers/2307/2307.02839.pdf Jul. 6, 2023.

Tham, "Summarize Podcast Transcripts and Long Texts Better with NLP and AI" https://towardsdatascience.com/summarize-podcast-transcripts-and-long-texts-better-with-nlp-and-ai-e04c89d3b2cb May 3, 2023.

Syed, "Indicative Summarization of Long Discussions" https://downloads.webis.de/publications/papers/syed_2023b.pdf Nov. 3, 2023.

Raedt, "IDAS: Intent discovery with Abstractive Summarization" Proceedings of the 5th Workshop on NPL for Conversational IP, pp. 71-88 https://aclanthology.org/2023.nlp4convai-1.7.pdf Jul. 14, 2023.

Nakshatri, "Using LLM for Improving Key Event Discovery: Temporal-Guided News Stream Clustering with Event Summaries" EMNLP'23 Findings Oct. 31, 2023.

Maass, "SNOOP Method: Faithfulness of Text Summarizations for Single Nucleotide Polymorphisms" https://www.iss.uni-saarland.de/wp-content/uploads/2023/07/Snoop_AAAI_SS23_MedicalAI_submission.pdf Jun. 7, 2023.

Liu et al., "Abstractive Summarization Of Large Document Collections Using GPT" https://arxiv.org/pdf/2310.05690.pdf Oct. 9, 2023.

Kurisinkel, "LLM Based Multi-Document Summarization Exploiting Main-Event Biased Monotone Submodular Content Extraction" https://aps.arxiv.org/pdf/2310.03414.pdf Oct. 5, 2023.

Feng, "Improving Factual Consistency of Text Summarization by Adversarially Decoupling Comprehensive and Embellishment Abilities of LLMs" https://aps.arxiv.org/pdf/2310.03414.pdf Nov. 14, 2023.

"Analyzing User Interactions with LLMs to Improve our documentation", https://blog.langchain.dev/llms-to-improve-documentation Jul. 13, 2023.

* cited by examiner

LANGUAGE MODEL SUMMARIZATION USING SEMANTICAL CLUSTERING

BENEFIT CLAIM

The application claims the benefit of U.S. Provisional Application No. 63/538,756, filed Sep. 15, 2023, the entire contents of which is hereby incorporated by reference as if full set forth herein, under 35 U.S.C. § 119(c).

TECHNICAL FIELD

The present disclosure generally relates to language models and, more particularly, to using language models to generate precise summaries through multi-level semantical clustering.

BACKGROUND

Text summarization is the process of condensing (e.g., extensive) information into a concise summary. However, while striving to capture the main points, language models (LMs) (and particularly large LMs (LLMs)) may inadvertently omit or misrepresent crucial details in the summarized text. This can result in a loss of context and essential nuances, potentially affecting the accuracy and comprehensiveness of the summary. For example, if an LLM-generated summary fails to incorporate vital details from a research paper, it may misrepresent the findings or overlook significant limitations, leading to incomplete or misleading information.

Also, LLMs may not be judicious in covering all concepts equally. For example, in response to receiving a prompt to summarize an input document where the prompt specifies a summary size restriction of 500 words, the LLM may generate 400 words based on the first 10% of the input document, resulting in having only 100 words to summarize the remaining 90% of the input document.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A system and method for precise LLM summarization using concept clustering are provided. In one technique, input text is segregated into concepts. A concept may be a phrase, a sentence, or multiple sentences. Then, the concepts are clustered or grouped such that similar concepts are part of the same concept cluster or group. Thus, the number of concept clusters may be smaller than the number of concepts. For each concept cluster, an LLM generates a summary of the concepts that belong to that concept cluster. The summary may be a sentence or multiple sentences. Then the summaries of the concept clusters are aggregated to generate a response.

In a related technique, input text is segregated into concepts and clustered or grouped to create a first set of concept clusters. In parallel, the input text is sent to an LLM to generate a summary. The same concept extraction is run on the generated summary to produce multiple concepts. The multiple concepts are clustered to generate a second set of concept clusters, which are then compared with the first set of concept clusters. If the sets of concept clusters match, then the generated summary is provided to the intended recipient(s). However, if the second set of concept clusters is missing one or more concept clusters from the first set, then the missing concept clusters are sent, along with the input text (or the text of missing concepts only) to the same or different LLM to summarize the missing concepts. The generated summary is aggregated with the generated summaries of the missing concepts. The aggregated summary may be provided to the intended recipient(s) or the aggregated summary is sent to another fine-tuned LLM for re-phrasing to remove potential grammar and style errors, etc. The combined summary may be sent to the system again to check for missing concepts. In this way, the system ensures that a generated summary covers every concept cluster from the original set of concept clusters.

Embodiments improve computer-related technology related to LLM summarization to ensure that a generated summary sufficiently covers concepts reflected in input text and not missed, improving the "extractive-ness" of an LLM summarization system. Embodiments also improve computer-related technology related to LLM summarization to reduce the usage of computer resources and time to generate a summary of a set of one or more documents.

GENERAL OVERVIEW

Figure 1:
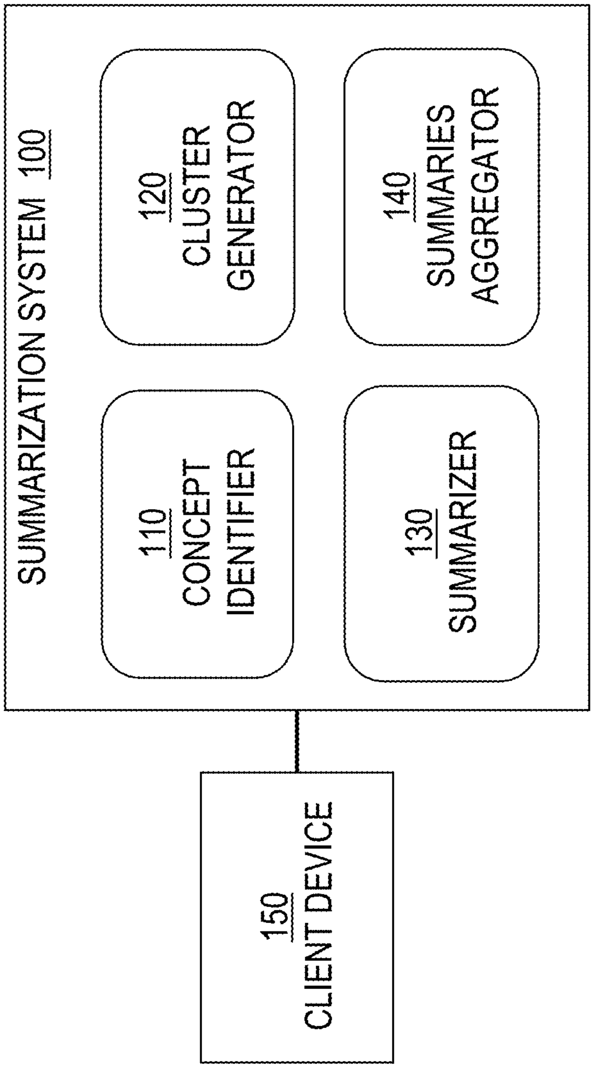
FIG. 1 is a block diagram that depicts an example summarization system, in an embodiment.

FIG. 1 is a block diagram that depicts an example summarization system 100, in an embodiment. Summarization system 100 produces summaries of documents. Each summary may be generated based on a set of one or more input documents. An input document may be a string of text or any file that contains text, such as an image that is subject to object character recognition (OCR). Summarization system 100 includes a concept identifier 110, a cluster generator 120, a summarizer 130, and a summary aggregator 140. Each of concept identifier 110, cluster generator 120, summarizer 130, and summary aggregator 140 may be implemented in software, hardware, or any combination of software and hardware.

Summarization system 100 may be connected to a computer network (not depicted) through which summarization system 100 receives summarization requests or prompts from one or more computing devices, such as client device 150. Examples of client device 150 include a desktop computer, a laptop computer, a tablet computer, a smartphone computer, and a wearable device. (Although only a single client device is depicted, summarization system 100 may be communicatively coupled to many client devices.) A summarization request from client device 150 includes text, one or more files containing text, and/or one or more reference (e.g., a uniform resource locator (URL)) to a remote location of a file/document that contains text (or content, such as image data, from which text may be extracted). The remote location may be file storage, cloud storage, or database storage. If a summarization request includes a reference, then summarization system 100 retrieves the electronic content that is referenced by the reference.

In response to receiving a summarization request, summarization system 100 causes concept identifier 110 to identify one or more concepts in text data of one or more documents that are included in (and/or referenced by) the summarization request. Concept identifier 110 may first divide this "input text data" into different segments, each segment corresponding to a sentence, a phrase of a sentence, or a group of sentences, such as a paragraph. A sentence may be identified by identifying consecutive periods in text data and extracting the text between those consecutive periods. A paragraph may be identified by identifying consecutive carriage return characters in text data and extracting the text between those consecutive carriage return characters.

First Approach

Embodiments include two different systems or approaches to control the extractive-ness of LLM summarization. The first system or approach has the finest control of extractive-ness, while the second system or approach is more computationally efficient. As described in more detail herein, the two systems or approaches may be used in parallel to complement each other.

Figure 2:
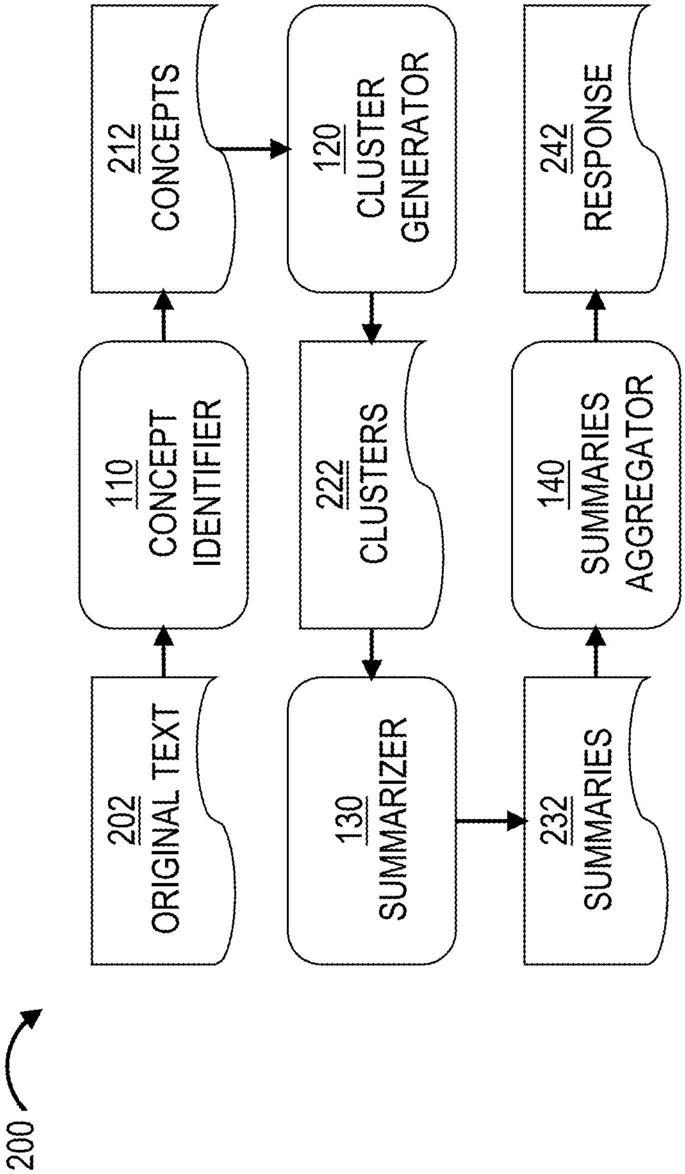
FIG. 2 is a block diagram that depicts a first example approach or process for providing LLM summarization using concept clustering, in an embodiment.

FIG. 2 is a block diagram that depicts an example approach or process 200 for providing LLM summarization using concept clustering, in an embodiment. Process 200 includes original text 202, which is input to client identifier 110 that segregates or separates original text 202 into multiple concepts 212. A concept may be a phrase, a sentence, or multiple sentences.

Cluster generator 120 accepts multiple concepts 212 as input and generates one or more groups or clusters of concepts, resulting in clusters 222 of concepts, each cluster comprising one or more concepts. In many cases, the number of clusters is fewer than the number of concepts that concept identifier 110 identifies.

In order to generate one or more concept clusters 222, cluster generator 120 (or concept identifier) generates a concept vector (or data representation) (also referred to as "embeddings") for each concept 212. A concept vector represents the concept and may be based on individual word vectors of the words that make up the concept. Cluster generator 120 compares two concept vectors to determine how closely related the corresponding concepts are. Comparing a pair of concept vectors may involve performing one or more similarity operations on the pair, such as cosine similarity or Euclidean distance. If two concept vectors are similar, then cluster generator 120 may assign the corresponding concepts in the same concept cluster.

Cluster generator 120 may employ a similarity threshold after computing a similarity score between a pair of concepts. If the similarity score of a pair of concepts is less than that similarity threshold (where a lower similarity score means higher similarity), then the pair of concepts are included in the same concept cluster. Otherwise, the pair of concepts are not included in the same concept cluster. Examples of clustering techniques includes K-means clustering, hierarchical clustering (agglomerative), DBSCAN (Density-based spatial clustering of applications), GMM (Gaussian Mixture Model), BIRCH (balanced iterative reducing and clustering using hierarchies), and Affinity Propagation.

First Approach: Adding a Concept to a Cluster

In a related embodiment, in order to add a new concept to an existing concept cluster, a similarity score is generated for each pair of concepts, where each pair includes the new concept and a different concept in the concept cluster. For example, a concept cluster includes concepts A, B, and C. A new concept is D. A similarity score is generated for {A, D}, one for {B, D}, and one for {C, D}. Each of the three similarity scores must be less than the similarity threshold in order to add the new concept to the concept cluster. Alternatively, a certain number of the generated similarity scores for a given new concept (e.g., at least two similarity scores) must be less than the similarity threshold in order to add the new concept to the concept cluster. Alternatively, a certain percentage of the generated similarity scores for a given new concept (e.g., at least 50%) must be less than the similarity threshold in order to add the new concept to the concept cluster.

Another factor that cluster generator 120 may employ when grouping concepts 212 is how many sentences apart two concepts are in original text 202. If two concepts are in the same sentence or are found in adjacent sentences, then the two concepts are more likely to be grouped into the same cluster. Thus, even though the similarity score of two concepts is greater than a similarity threshold (meaning the two corresponding concept vectors are not similar enough), the two concepts may be grouped together because there is no text between the two concepts in original text 202.

First Approach: Cluster Management

In an embodiment, cluster generator 120 performs a cluster number check. For example, if the number of clusters 222 is greater than a first threshold number (indicating there are too many clusters), then cluster generator 120 may increase the similarity threshold, which is more likely to cause less concepts to be grouped together in the same cluster. Conversely, if the number of clusters 222 is less than a second threshold number (indicating there are too few clusters), then cluster generator 120 may decrease the similarity threshold, which is more likely to cause more concepts to be grouped separately from one another.

After adjusting the similarity threshold and computing another set of concept clusters, cluster generator 120 may perform another cluster number check. This process may repeat until the number of concept clusters is within a particular range defined by the first threshold number and the second threshold number. In some scenarios, there may be no minimum number of clusters.

First Approach: Filtering Clusters

In an embodiment, in addition to or instead of adjusting a similarity threshold to control the number of concept clusters, cluster generator 120 may identify one or more concept clusters based on size and remove those concept clusters. For example, if a concept cluster has less than three concepts, then the concept cluster is removed from consideration, meaning the text (in original text 202) that corresponds to the concepts in the concept cluster will not be summarized.

In a related embodiment, after a set of concept clusters is generated, if a concept cluster is associated with less than a threshold number of phrases/sentences/paragraphs/sections in original text 202, a less than threshold number of characters or bytes in original text 202, or a less than threshold percentage of all the content that is to be summarized, then the concept cluster may be removed from consideration. For example, if a concept cluster is only associated with three or fewer sentences, then the concept cluster is removed from consideration (and, therefore, the three or fewer sentences will not be summarized). As another example, if a concept cluster is associated with less than 5% of all the content that is to be summarized (which content may be spread out over multiple documents), then the concept cluster is removed from consideration.

In an embodiment, an input to cluster generator 120 is data from a prompt to generate a summary, where the prompt includes not only original text 202 (or a reference thereto), but also a number of sentences/paragraphs/sections for a summary. Thus, cluster generator 120 adjusts one or more hyperparameters until it generates a number of concept clusters that is equal to the number of sentences/paragraphs/sections indicated in the prompt. For example, if a prompt requests a seven-sentence summary, then cluster generator 120 attempts to generate seven clusters. As another example, if a prompt requests a five-hundred word summary, then cluster generator 120 determines a number of words per sentence, divides the word limit by the determined number to compute a number of sentences, and attempts to generate a number of clusters that is equal to, or divisible by, that number of sentences.

First Approach: Summarization

Summarizer 130 generates a summary of the text corresponding to each concept cluster 222, resulting in summaries 232. For example, if concept cluster 1 includes three concepts, then the text of those three concepts from original text 202 is identified and input into summarizer 130, which outputs a summary based on the inputted text. Summarizer 130 repeats this for each concept cluster of clusters 222. Summarizer 130 includes an LLM for summarizing and zero or more other components, such as a component that generates prompts for LLM.

In an embodiment, summarizer 130 (or one of the components of summarizer 130) determines a size of a summary that summarizer 130 generated for a concept cluster. If the size is greater than a first threshold, then summarizer 130 (or the associated LLM) is prompted to generate (and does generate) a shorter summary. A prompt to the LLM of summarizer 130 may specify a specific number of characters, lines, or sentences. If the size of a generated summary is less than a second threshold, then summarizer 130 (or its associated LLM) is prompted to generate (and does generate) a longer summary.

In an embodiment, summarizer 130 generates a summary for each concept cluster based on the size of the concept cluster (e.g., in number in concepts or in the portion of original text 202 that corresponds to the concepts in the concept cluster). For example, the more concepts in a concept cluster, the longer the summary may be.

In a related embodiment, the size of a summary (of a concept cluster) that summarizer 130 generates is based on the size of the concept cluster (e.g., in number in concepts or in the portion of original text 202 that corresponds to the concepts in the concept cluster) relative to the size of the other generated concept clusters. For example, if concept cluster 1 is the largest of the generated clusters, then the summary of concept cluster 1 is to be larger than the summaries of the other generated concept clusters. As a similar example, if concept cluster 1 corresponds to 40% of original text 202, concept cluster 2 corresponds to 30% of original text 202, concept cluster 3 corresponds to 20% of original text 202, and concept cluster 4 corresponds to 10% of original text 202, then the summary of concept cluster 1 is about twice as large as the summary of concept cluster 3 and about four times larger than the summary of concept cluster 4, and the summary of concept cluster 2 is about three times larger than the summary of concept cluster 4. Such a relative size difference may be enforced with prompts to the LLM of summarizer 130.

First Approach: Aggregating Summaries

Summaries aggregator 140 generates a response 242 by aggregating summaries 232 of the generated concept clusters 222. This aggregation may involve appending each subsequent summary to a previous summary. Cluster concepts 222 may be ordered based on the cluster concept that has the concept that is earliest in original text 202. Thus, the generated summary of concept cluster 2 is appended to the generated summary of concept cluster 1, the generated summary of concept 3 is appended to the aggregated summary of concept clusters 1 and 2, and so forth.

In an embodiment, summaries aggregator 140 checks the size of response 242. If response 242 is greater than a first threshold, then summaries aggregator 140 may perform one of multiple actions, such as (i) removing, from response 242, one or more summaries of summaries 232, or (ii) prompting an LLM (e.g., of summarizer 130) to generate a summary of response 242. The prompt may specify a target size of the new summary.

In an embodiment, response 242 is input to an LLM re-phraser to rephrase the response 242 so that response 242 "flows" better. This LLM re-phraser may be the same LLM as the LLM of summarizer 130, but is prompted with a "re-phrase" prompt rather than a "generate summary" prompt.

Second Approach

Figure 3:
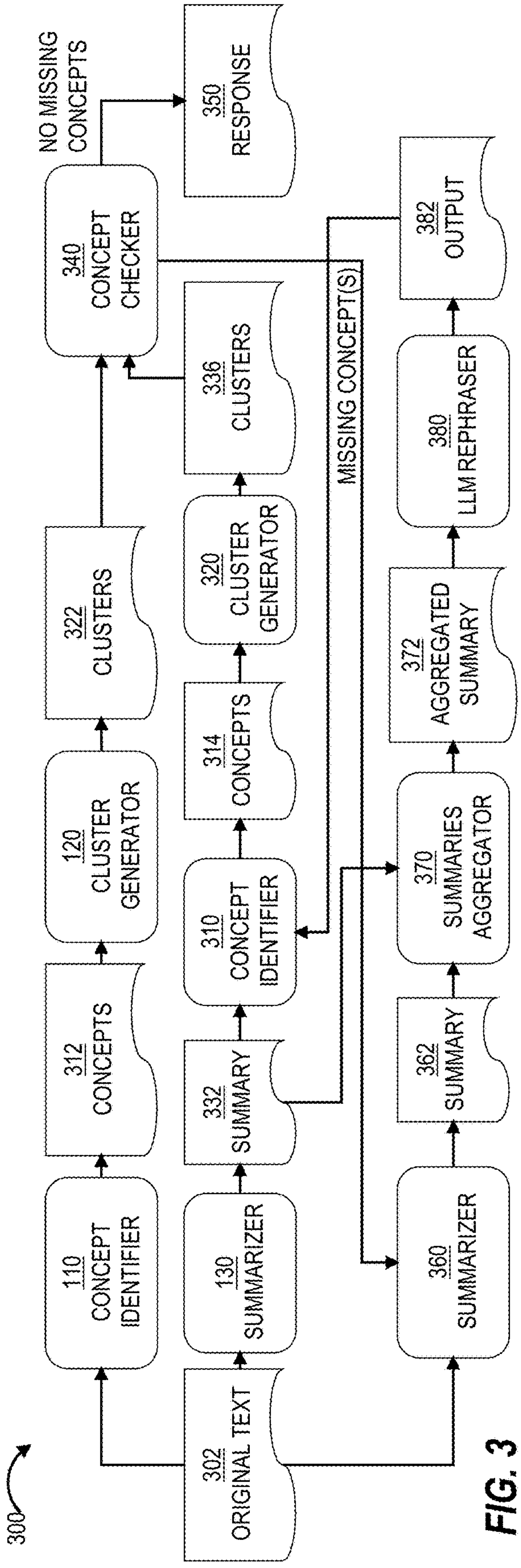
FIG. 3 is a block diagram that depicts a second example process or approach for providing LLM summarization using concept clustering, in an embodiment.

FIG. 3 is a block diagram that depicts an example process or approach 300 for providing LLM summarization using concept clustering, in an embodiment. Process 300 is similar to process 200, except that process 300 is more computationally efficient while process 200 has the finest control of extractive-ness. Process 300 includes original text 302, which is input to a concept identifier 110 that segregates or separates original text 302 into multiple concepts 312.

Again, a concept may be a phrase, a sentence, multiple sentences, a paragraph, or a section. Cluster generator 120 accepts the multiple concepts 312 as input and generates one or more groups or clusters 322, each cluster comprising one or more concepts from concepts 312.

Original text 302 is also input to summarizer 130. This may be performed in parallel with concept identifier 110 and/or cluster generator 120 performing their respective steps/operations with respect to original text 302 or concepts 312. The output of summarizer 130 is a summary 332 of original text 302. Summary 332 is segregated or separated into individual concepts 334. Such segregation may be performed by the same component (e.g., concept identifier 110) that segregates original text 302. Also, the component (i.e., cluster generator 120) that clustered or grouped concepts 312 (that concept identifier 110 identified based on original text 302) may be the same component that clusters or groups the concepts that were identified based on a summary of original text 302, which resulting clusters or groups is clusters 336.

Second Approach: Concept Checker

In this second approach embodiment, summarization system 100 includes a concept checker 340, which determines whether any of concept clusters 322 are missing from concept clusters 336. For example, concept clusters 322 may include cluster A, cluster B, and cluster C, while concept clusters 336 include cluster A and cluster C. In this example, cluster B is missing from clusters 336. To ensure that the concept clusters from each clustering step produce similar sets of concept clusters, the same cluster component (i.e., cluster generator 120) may be used or, if different cluster components are used, then the same hyperparameters are used. Thus, the same or similar similarity scale is used in each clustering step.

In order to determine whether one or more concept clusters are missing, concept checker 340 determines a first number of concept clusters in clusters 322 and a second number of concept clusters in clusters 336. If the first number is greater than the second number, then one or more concept clusters are missing. If the first number equals the second number, then it may be presumed that there are no concept clusters missing and further analysis to determine whether any concept clusters are missing may cease. If the first number is less than the second number, then it may be presumed that there are no concept clusters missing.

If a concept cluster is determined to be missing (e.g., based on a difference in number of concept clusters in the respective sets), then concept checker 340 identifies which concept cluster(s) from clusters 322 is/are missing from clusters 336. This may be performed using the following steps. First, for each concept cluster in clusters 322 and 336, concept checker 340 generates a cluster vector that is an aggregation of the concept vectors associated with the concepts in that cluster. Second, concept checker 340 selects a cluster in concept cluster 336. Third, concept checker 340 compares the cluster vector of the selected cluster with the cluster vector of each cluster in clusters 322. The cluster in clusters 322 that is associated with the "closest" cluster vector to the cluster vector of the cluster in clusters 336 is matched to that cluster in cluster 336. The second and third steps repeat for each other cluster in clusters 336. The concept cluster(s) in clusters 322 that have not been matched to a concept cluster in clusters 336 is/are considered to be missing concept clusters.

Second Approach: No Missing Concept Clusters

If there are no missing concept clusters, then summary 332 that was mostly recently generated by summarizer 130 given original text 302 is returned as a response 350. This means that summarizer 130 might only be invoked only once instead of once for each concept cluster, as in the first approach, where summarizer 130 is invoked once for each concept cluster. If summarizer 130 is invoked once, then response 350 is summary 332. If summarizer 130 (or a summarizing LLM) is invoked multiple times for original text 302, then response is output 382, described in more detail herein.

Second Approach: At Least One Missing Concept Checker

If there are one or more missing concept clusters, then process 300 proceeds to summarizer 360, which may be the same as summarizer 130. Concept checker 340 may pass the missing concepts to summarizer 130 in the form of a prompt. For example, a prompt from concept checker 340 may include original text 302 plus a prompt to generate a summary of the portion of original text 302 that includes the missing concepts. As another example, the prompt may include only the portion, of original text 302, that contains concepts from the missing concept clusters. If there are multiple missing concept clusters, then summarizer 360 may be called or invoked once for each missing concept cluster. Alternatively, summarizer 360 may be called or invoked once and all the missing concept clusters (or their corresponding text in original text 302) are input to the call. Alternatively, if summarizer 360 has proven to be good at generating summaries for text that has less than four concept clusters, then summarizer 360 may be called multiple times, but with two or three missing concept clusters in each call.

In a related embodiment, the percentage of missing concept clusters relative to the total number of concept clusters 322 is a factor in determining how often summarizer 360 is involved. For example, if more than 40% of clusters 322 are missing from clusters 336, then summarizer 360 is invoked once for each missing concept cluster. On the other hand, if less than 20% of clusters 322 are missing from clusters 336, then summarizer 360 is invoked only once for all missing concept clusters, and those missing concept clusters are indicated in a single prompt to summarizer 360.

The originally-generated summary from summarizer 130 (i.e., summary 332) and the output from summarizer 360 (i.e., summary 362) are aggregated or combined by summaries aggregator 370 to produce an aggregated summary 372. Aggregated summary 372 is input to LLM rephraser 380, which may be the same as summarizer 360 (in which case a prompt for it is to rephrase two summaries) or may be a different LLM that is trained on re-phrasing tasks. Thus, LLM rephraser 380 may be fine-tuned to remove potential grammar and style errors. The prompt to LLM rephraser 380 may include just the two summaries and, optionally, original text 302. The output/result of LLM rephraser 380 is sent to concept identifier 110 for identifying concepts in the output/result. Thereafter, the process repeats, except with the latest re-phrased aggregated summary. Thus, LLM summarization is performed at least two times if there are one or more missing concepts in the first invocation of concept checker 240.

Switching Approaches

In an embodiment, both the first approach and the second approach are implemented. For example, the second approach is active (meaning the first approach is inactive) if summarizer 130 is summarizing original text consistently without missing any concepts. If summaries generated by summarizer 130 begin to miss concepts regularly or often (e.g., 40% or more of the time), then the first approach is followed.

As another example, the first approach is active initially to first ensure that summarizer 130 produces accurate and grammatically-correct summaries and that summaries aggregator 140 is producing readable and grammatically-correct summaries. Then, once those two components are determined to be functioning properly for a period of time (e.g., a week), the second approach becomes active and the first approach becomes inactive.

In an embodiment, different contexts and/or different audiences may have different thresholds for when to switch approaches. For example, if text to be summarized is sports related, then the threshold percentage of missing concepts above which will cause the first approach to be utilized may be 40%, whereas the threshold percentage of missing concepts for medical related text is 10%.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
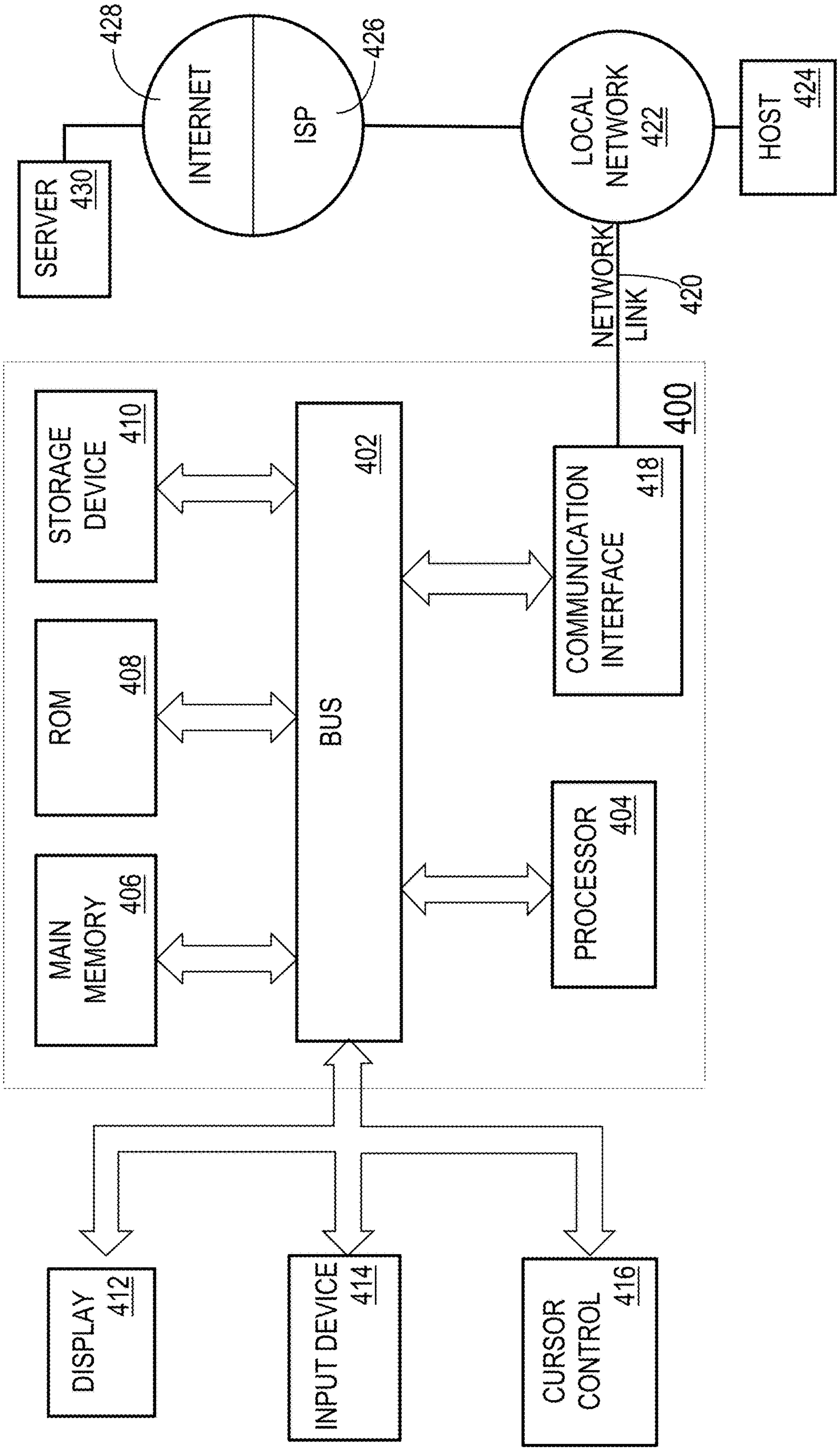
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
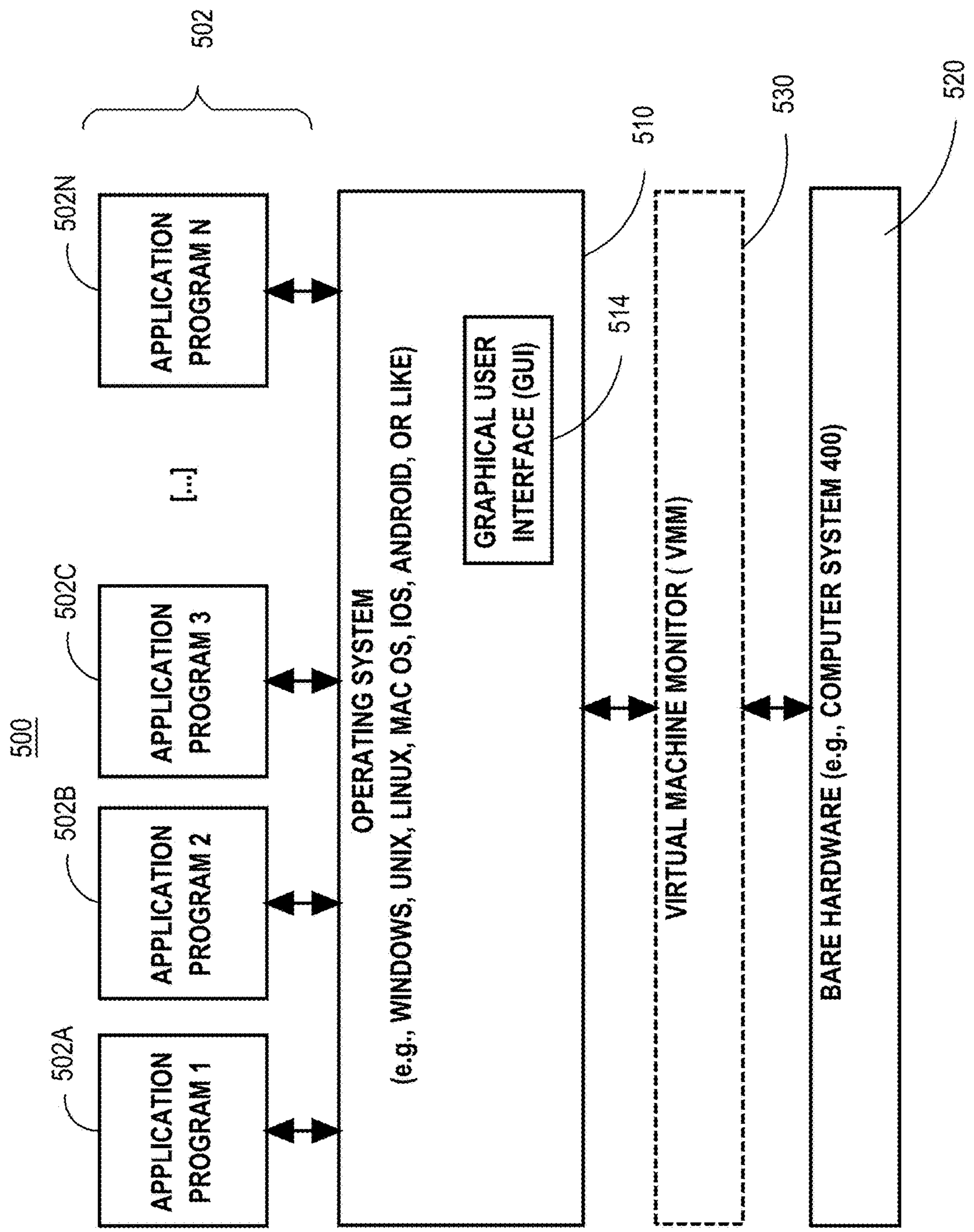
FIG. 5 is a block diagram of a basic software system that may be employed for controlling the operation of the computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
- identifying a first plurality of concepts reflected in text data;
- generating, by a first automated clustering technique, a first plurality of concept clusters based on similarity among the first plurality of concepts;
- generating a first summary based on automatically providing the text data to a first language model;
- identifying a second plurality of concepts reflected in the first summary;
- generating, by a second automated clustering technique, a second plurality of concept clusters based on similarity among the second plurality of concepts;
- determining whether the second plurality of concept clusters is missing one or more concept clusters from the first plurality of concept clusters;
- in response to determining that the second plurality of concept clusters is missing one or more concept clusters from the first plurality of concept clusters:
  - generating a second summary based on automatically providing, to a second language model, text, from the text data, that corresponds to the one or more concept clusters;
  - generating an aggregated summary based on the second summary and the first summary;
- wherein the method is performed by one or more computing devices.

2. The method of claim 1, further comprising:
- identifying a third plurality of concepts reflected in second text data;
- generating a third plurality of concept clusters based on similarity among the third plurality of concepts;
- causing the first language model to generate a third summary based on the second text data;
- identifying a fourth plurality of concepts reflected in the third summary;
- generating a fourth plurality of concept clusters based on similarity among the fourth plurality of concepts;
- determining whether the fourth plurality of concept clusters is missing one or more concept clusters from the third plurality of concept clusters;
- in response to determining that the fourth plurality of concept clusters is not missing any concept clusters from the third plurality of concept clusters, providing the third summary as a response to a request to summarize the second text data.

3. The method of claim 1, wherein determining whether the second plurality of concept clusters is missing the one or more concept clusters from the first plurality of concept clusters comprises:
- determining a first number of concept clusters in the first plurality of concept clusters;
- determining a second number of concept clusters in the second plurality of concept clusters;
- comparing the first number to the second number.

4. The method of claim 1, further comprising:
- generating a first plurality of cluster vectors for the first plurality of concept clusters;
- generating a second plurality of cluster vectors for the second plurality of concept clusters;
- for each cluster vector in the second plurality of cluster vectors:
  - performing a comparison of said each cluster vector with each cluster vector in the first plurality of cluster vectors;
  - identifying, from among the first plurality of cluster vectors, a cluster vector that is closest to said each cluster vector;

associating the cluster vector with said each cluster vector;

identifying one or more cluster vectors, in the first plurality of cluster vectors, that is not associated with a cluster vector in the second plurality of cluster vectors.

5. The method of claim 1, wherein the second language model is the first language model.

6. The method of claim 1, further comprising:

causing a third language model to generate output based on the aggregated summary;

identifying a third plurality of concepts reflected in the output;

generating a third plurality of concept clusters based on similarity among the third plurality of concepts;

determining whether the third plurality of concept clusters is missing any concept clusters from the first plurality of concept clusters.

7. The method of claim 6, further comprising:

in response to determining that the third plurality of concept clusters is not missing any concept clusters from the first plurality of concept clusters, providing the output in response to a request to summarize the text data.

8. The method of claim 6, further comprising:

in response to determining that the third plurality of concept clusters is missing one or more second concept clusters from the first plurality of concept clusters:

causing the second language model to generate a third summary based on second text, from the text data, that corresponds to the one or more second concept clusters;

generating a second aggregated summary based on the third summary and the second summary.

9. The method of claim 1, further comprising:

in response to determining that the second plurality of concept clusters is missing the one or more concept clusters from the first plurality of concept clusters, storing data that indicates that the second plurality of concept clusters is missing one or more concept clusters from the first plurality of concept clusters;

based on the data, determining whether to implement an approach that involves causing a second language model to generate summaries of multiple concept clusters, that are based on input text data, without first causing a language model to generate a summary directly from the input text data.

10. A method comprising:

identifying a plurality of concepts reflected in text data;

generating, by a first automated clustering technique, a plurality of concept clusters based on similarity among the plurality of concepts;

for each concept cluster of the plurality of concept clusters:

based on a size of text, in the text data, that corresponds to the concepts in said each concept cluster, determining a particular size;

generating a prompt that indicates the particular size;

sending the prompt to a language model, causing the language model to generate a summary of the text corresponding to the concepts in said each concept cluster;

wherein, for a first concept cluster of the plurality of concept clusters, a first size is determined based on a size of first text, in the text data, that corresponds to concepts in the first concept cluster;

wherein, for a second concept cluster, of the plurality of concept clusters, that is different than the first concept cluster, a second size is determined based on a size of second text, in the text data, that corresponds to concepts in the second concept cluster;

wherein the size of the first text is different than the size of the second text;

generating a summary response of the text data by aggregating the summary of each concept cluster of the plurality of concept clusters;

wherein the method is performed by one or more computing devices.

11. The method of claim 10, wherein the plurality of concept clusters is a second plurality of concept clusters, further comprising:

prior to generating the second plurality of concept clusters, generating a first plurality of concept clusters based on the plurality of concepts;

determining whether the number of concept clusters in the first plurality of concept clusters is outside of a particular range.

12. The method of claim 11, wherein generating the first plurality of concept clusters is based on a first measure of similarity among the plurality of concepts, the method further comprising:

in response to determining that the number of concept clusters in the first plurality of concept clusters is outside of the particular range, adjusting the first measure of similarity to be a second measure of similarity that is different than the first measure of similarity;

wherein generating the second plurality of concept clusters comprises generating the second plurality of concept clusters based on the second measure of similarity.

13. The method of claim 11, further comprising:

determining whether the number of concept clusters in the second plurality of concept clusters is outside of the particular range;

wherein causing the language model to generate the summary is performed in response to determining that the number of concept clusters in the second plurality of concept clusters is inside the particular range.

14. The method of claim 11, further comprising:

in response to determining that the number of concept clusters in the first plurality of concept clusters is greater than a threshold number, identifying one or more concept clusters that are associated with the least amount of text in the text data among the concept clusters in the first plurality of concept clusters;

wherein the second plurality of concept clusters is a subset of the first plurality of concept clusters.

15. The method of claim 10, further comprising:

determining whether a size of the summary response is greater than a threshold size;

in response to determining that the size of the summary response is greater than the threshold size, generating a second summary response whose size is smaller than the threshold size.

16. The method of claim 15, wherein generating the second summary response comprises removing, from the summary response, one or more summaries of one or more concept clusters of the plurality of concept clusters.

17. The method of claim 10, further comprising:

identifying a first plurality of concepts reflected in first text data;

generating a first plurality of concept clusters based on similarity among the first plurality of concepts;

causing a first language model to generate a first summary based on the first text data;

identifying a second plurality of concepts reflected in the first summary;

generating a second plurality of concept clusters based on similarity among the second plurality of concepts;

determining whether the second plurality of concept clusters is missing one or more concept clusters from the first plurality of concept clusters.

18. One or more non-transitory storage media storing instructions which, when executed by one or more computing devices, cause:

identifying a first plurality of concepts reflected in text data;

generating, by a first automated clustering technique, a first plurality of concept clusters based on similarity among the first plurality of concepts;

generating a first summary based on automatically providing the text data to a first language model;

identifying a second plurality of concepts reflected in the first summary;

generating, by a second automated clustering technique, a second plurality of concept clusters based on similarity among the second plurality of concepts;

determining whether the second plurality of concept clusters is missing one or more concept clusters from the first plurality of concept clusters;

in response to determining that the second plurality of concept clusters is missing one or more concept clusters from the first plurality of concept clusters:

generating a second summary based on automatically providing, to a second language model, text, from the text data, that corresponds to the one or more concept clusters;

generating an aggregated summary based on the second summary and the first summary.

19. One or more non-transitory storage media storing instructions which, when executed by one or more computing devices, cause:

identifying a plurality of concepts reflected in text data;

generating, by a first automated clustering technique, a plurality of concept clusters based on similarity among the plurality of concepts;

for each concept cluster of the plurality of concept clusters:

based on a size of text, in the text data, that corresponds to the concepts in said each concept cluster, determining a particular size;

generating a prompt that indicates the particular size;

sending the prompt to a language model, causing the language model to generate a summary of the text corresponding to the concepts in said each concept cluster;

wherein, for a first concept cluster of the plurality of concept clusters, a first size is determined based on a size of first text, in the text data, that corresponds to concepts in the first concept cluster;

wherein, for a second concept cluster, of the plurality of concept clusters, that is different than the first concept cluster, a second size is determined based on a size of second text, in the text data, that corresponds to concepts in the second concept cluster;

wherein the size of the first text is different than the size of the second text;

generating a summary response of the text data by aggregating the summary of each concept cluster of the plurality of concept clusters.

20. The one or more storage media of claim 19, wherein the plurality of concept clusters is a second plurality of concept clusters, wherein the instructions, when executed by the one or more computing devices, further cause:

prior to generating the second plurality of concept clusters, generating a first plurality of concept clusters based on the plurality of concepts;

determining whether the number of concept clusters in the first plurality of concept clusters is outside of a particular range.

* * * * *